United States Patent [19]

Zompetta

[11] 3,990,590

[45] Nov. 9, 1976

[54] DEVICE FOR COLLECTING MATERIALS IN BULK INSIDE A TANK

[76] Inventor: Antonio Zompetta, No. 105, Via Dario Niccodemi, Rome, Italy

[22] Filed: Jan. 10, 1974

[21] Appl. No.: 432,226

[30] Foreign Application Priority Data

Oct. 12, 1973 Italy .................................. 53107/73

[52] U.S. Cl. ............................ 214/17 C; 214/83.32; 259/16; 198/658; 214/507

[51] Int. Cl.[2] ............................................ B60P 1/42

[58] Field of Search ............... 214/507, 83.32, 17 C, 214/17 D; 259/16, 14, 15; 198/215

[56] References Cited

UNITED STATES PATENTS

| | | | |
|---|---|---|---|
| 3,104,022 | 9/1963 | Schaffler et al. | 214/507 |
| 3,204,789 | 9/1965 | Riedl | 214/507 |
| 3,559,795 | 2/1971 | Talenti | 214/507 |

*Primary Examiner*—Albert J. Makay
*Attorney, Agent, or Firm*—John J. Byrne; Edward E. Dyson

[57] ABSTRACT

A device for collecting materials in bulk inside a tank, preferably a rotating tank, comprising a discoid element rotatably mounted on the inner wall adjacent the charging mouth, and provided with a plurality of ribs or ridges destined to contact the material introduced into the tank, so as to facilitate the filling of the tank and to reduce appreciably the friction between the contacting parts.

3 Claims, 3 Drawing Figures

DEVICE FOR COLLECTING MATERIALS IN BULK INSIDE A TANK

The present invention relates to a device for collecting materials in bulk, particularly solid city waste, inside a tank particularly a tank rotating about a horizontal axis.

Various kinds of devices of the related kind have been planned and embodied, generally mounted on a truck, destined to collect the solid city waste. In most cases, there is a rotating tank, with its fore end closed, and provided at its other end with a charging mouth, associated to an inwards inclined chute surface. Said chute surface cooperates with a set of conveying elements for progressively conveying the material coming from the charging mouth towards the inside of the tank, until obtaining the total filling thereof. The tank is emptied by opening a door adjacent said charging mouth, and causing the tank to rotate in contrary sense so as to obtain an outwards directed thrust by said conveying elements, determing thus the complete discharge of the material.

The greater drawback occurring in said devices consists in the rapid wear of the surfaces adjacent the charging mouth, said wear being due to the continuous sliding of the material on the surfaces themselves.

The purpose of this invention is that of solving the aforesaid problem.

According to this invention a discoid element is provided rotatably mounted on the inner wall adjacent the charging mouth, and provided with a plurality of ridges or ribs destined to contact the material inside the tank, and facilitating the discoid to be rotated, causing thus the filling of the tank, with a remarkable reduction of the friction between the contacting parts, due to the rotational movement of said discoid element.

Also according to this invention, said discoid element comprises a substantial part of the surface of the partition wall between the charging mouth and the inside of the tank, and is idly mounted on the wall itself. If the case may be, said discoid rotating element could also be operated by an independent engine, or by a drive leading to the control device for the rotation of the tank.

This invention will be now described with reference to the attached drawing showing by way of non limitative example one preferred embodiment of the invention itself. In the drawings.

Figure 2:
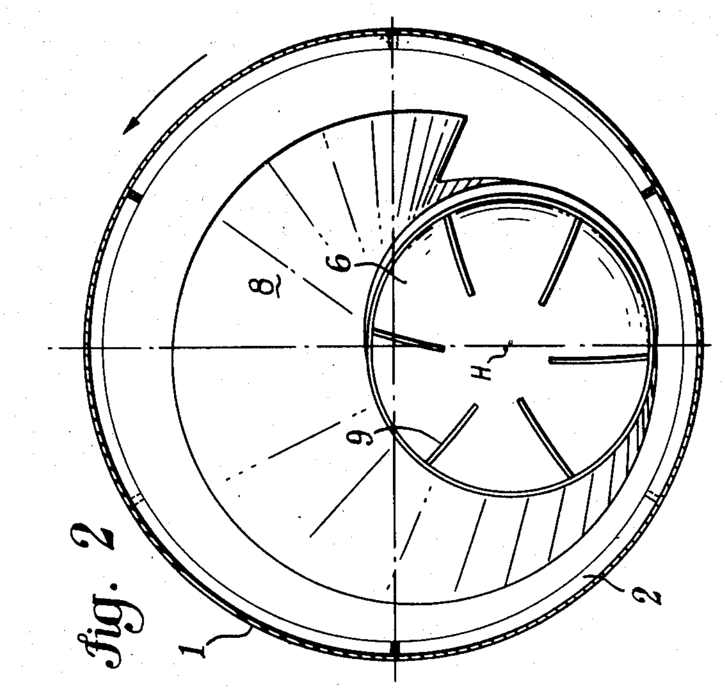
FIG. 2 shows a sectional view taken along the line II—II of FIG. 1.
Figure 3:
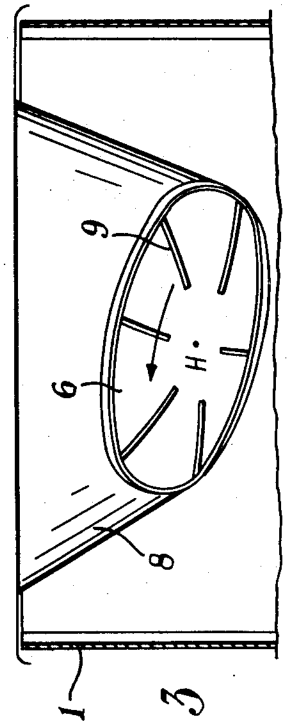
FIG. 3 is a top plan view with certain parts removed for sake of clearness.
Figure 1:
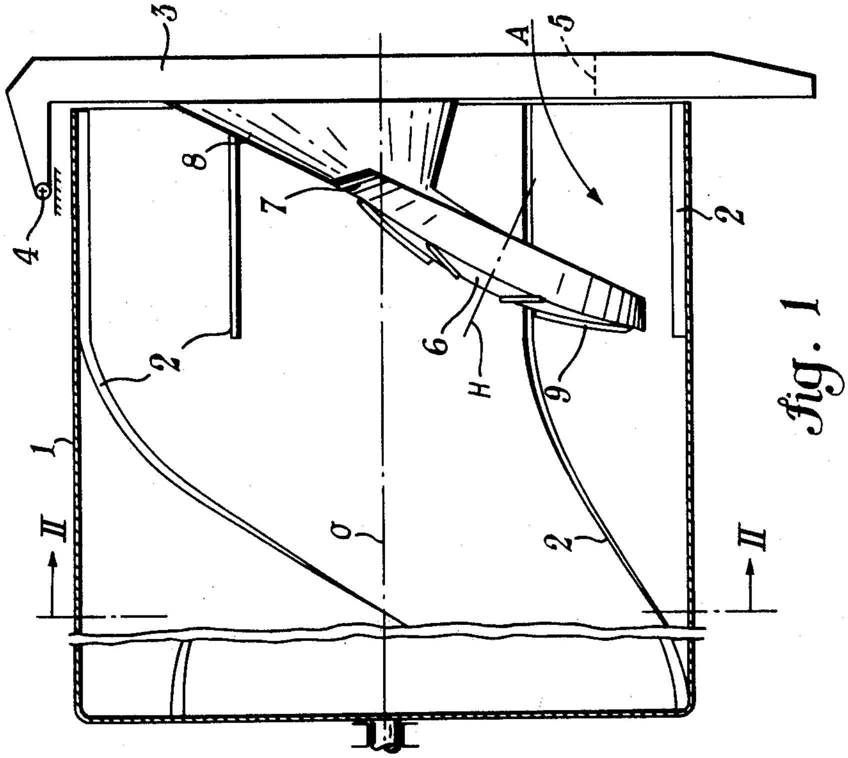
FIG. 1 is a diagrammatical longitudinal sectional view of a rotating tank provided with the device according to the present invention.

With reference to the drawings, the numeral reference 1 denotes the tank which rotates about the axis O, provided with internal ribs 2 for introducing the material, and with a door 3 hinged in 4, destined to allow the tank to be emptied.

Near the base of the door 3 a charging mouth 5 is provided, through which the material is entered into the tank 1, along the direction as shown by the arrow A.

This invention provides a discoid element 6 mounted so as to be able of rotating about the rotation axis H, and carried by an annular frame 7 within which element 6 is rotatably mounted. Frame 7 is rigid with the shaped wall 8 which divides the charging mouth from the inside of the tank. In the example shown in the drawings, the rotating body 6 has the shape of a spherical segment and is provided with a set of radial ribs or ridges 9, being however understood that both the shape of the body 6 and that of said ridges can be different, and also different can be the shape of the wall 8.

The operation is as follows: the material is supplied through the charging mouth 5 while the tank is rotating, and said material will be located, by a rolling movement, on the bottom part of the tank.

When the level of the material inside the tank reaches a certain value, the layer of the material will contact the discoid 6 which will be thereby rotated, eliminating thus substantially the sliding friction in correspondence with the zone occupied by said rotating body 6. In this connection it is to be noted that the body 6 occupies a zone in the shaped wall 8 wherein the friction is more intense, but it is to be understood that the surface of said rotating element 6 can at the limit, extend throughout the entire surface of the wall 8. By the rotation of the body 6 (which can be actuated by a driving action by the material rolling inside the tank, or by a suitable engine) an axial thrust is obtained on the material by the rotating body which by its ribs 9 carries the material which is being charged to be compressed between said body and the already charged material. This double action allows, besides the already cited advantages, of requiring a minimum power for operating the system and a large reduction of the stresses to which the mechanical unit of the equipment mounted on the truck is submitted.

In the described example, the axes of rotation 0 of the tank, and H of the rotating body 6 are skew, it is understood that they can be also parallel or coincident. The same comments are valid for the geometrical shape of the rotating body and the ridges or ribs carried by said body.

Also a solution can be provided where the tank is stationary and the filling thereof is obtained only by the rotating body which in this case is provided with an autonomous engine.

The present invention has been described in an embodiment at present preferred, being however understood that constructive changes might be practically adopted without departing from the scope of the present industrial privilege.

Having thus described the present invention, what is claimed is:

1. A device for collecting materials in bulk, comprising a rotatable elongated tank having a cylindrical interior, a closed end and a charging end, means on said interior adjacent said charging end for raising materials introduced into said rotating tank, a partition at said charging end partially enclosing said charging end, a discoid element rotatably mounted in said partition having an inner surface, and a plurality of ribs on said surface disposed substantially perpendicular to the longitudinal axis of said tank for contacting the material introduced into said tank whereby the filling of said tank is facilitated by reducing friction.

2. A device of claim 1 wherein said discoid element occupies a substantial part of the surface of said partition between the charging mouth and the inside of the tank.

3. The device of claim 1 wherein said means are ribs extending lengthwise of said tank a sufficient distance to raise said materials above said discoid element as said tank rotates.

* * * * *